(12) United States Patent
Lee (10) Patent No.: US 8,300,193 B2
(45) Date of Patent: Oct. 30, 2012

(54) LIQUID CRYSTAL DISPLAY PANEL AND PIXEL

(75) Inventor: Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1142 days.

(21) Appl. No.: 12/055,324

(22) Filed: Mar. 26, 2008

(65) Prior Publication Data

US 2009/0059150 A1  Mar. 5, 2009

(30) Foreign Application Priority Data

Aug. 28, 2007  (TW) ................................ 96131836 A (51) Int. Cl.
*G02F 1/1333* (2006.01)
*G02F 1/1343* (2006.01)

(52) U.S. Cl. ........................................ 349/144; 349/138
(58) Field of Classification Search .......... 349/139–144; 345/103
See application file for complete search history.

(56) References Cited

U.S. PATENT DOCUMENTS

| | | | |
|---|---|---|---|
| 6,335,771 B1 * | 1/2002 | Hiraishi | 349/42 |
| 6,407,791 B1 * | 6/2002 | Suzuki et al. | 349/129 |
| 6,774,967 B2 | 8/2004 | Kim et al. | |
| 6,836,306 B2 | 12/2004 | Kubota et al. | |
| 6,842,207 B2 * | 1/2005 | Nishida et al. | 349/107 |
| 6,853,427 B2 | 2/2005 | Park et al. | |
| 6,873,386 B2 | 3/2005 | Kim et al. | |
| 6,888,598 B2 | 5/2005 | Kim et al. | |
| 6,900,869 B1 | 5/2005 | Lee et al. | |
| 6,922,483 B2 | 7/2005 | Doane | |
| 6,954,248 B2 | 10/2005 | Song et al. | |
| 7,016,001 B2 | 3/2006 | Tanaka et al. | |
| 7,499,132 B2 * | 3/2009 | Hanaoka et al. | 349/129 |
| 7,697,106 B2 * | 4/2010 | Sawasaki et al. | 349/155 |
| 2003/0071952 A1 * | 4/2003 | Yoshida et al. | 349/141 |
| 2004/0070718 A1 * | 4/2004 | Saigo et al. | 349/141 |
| 2004/0207794 A1 * | 10/2004 | Miyachi et al. | 349/143 |

(Continued)

FOREIGN PATENT DOCUMENTS

| | | |
|---|---|---|
| CN | 1664678 | 9/2005 |
| TW | 200617493 | 6/2006 |
| TW | 200634413 | 10/2006 |

OTHER PUBLICATIONS

"Office Action of Taiwan Counterpart Application", issued on Jul. 20, 2011, p1-p7, in which the listed references were cited.

*Primary Examiner* — Uyen Chau N Le
*Assistant Examiner* — Michael Mooney
(74) *Attorney, Agent, or Firm* — Jianq Chyun IP Office (57) ABSTRACT

A liquid crystal display panel including an opposite substrate, an active device array substrate, and a liquid crystal layer is provided. The opposite substrate has a common electrode. The active device array substrate has a plurality of scan lines, data lines, and pixels. Each of the pixels is controlled by one of the scan lines and one of the data lines, correspondingly. Each pixel has an active device, a first pixel electrode having a first slit and electrically connected to the active device, a dielectric layer covering the first pixel electrode, and a second pixel electrode having a second slit and disposed between the dielectric layer and the opposite substrate. The first pixel electrode is electrically connected to the second pixel electrode. The first and second slits are substantially aligned to each other, and the width of first slit is smaller than that of second slit.

32 Claims, 9 Drawing Sheets

U.S. PATENT DOCUMENTS

| | | | |
|---|---|---|---|
| 2004/0233360 A1* | 11/2004 | Yoshida et al. | 349/114 |
| 2005/0200777 A1 | 9/2005 | Nagano et al. | |
| 2006/0146243 A1* | 7/2006 | Nakanishi et al. | 349/139 |
| 2007/0046877 A1 | 3/2007 | Lin et al. | |
| 2007/0188689 A1* | 8/2007 | Nakamura | 349/122 |

* cited by examiner

LIQUID CRYSTAL DISPLAY PANEL AND PIXEL

CROSS-REFERENCE TO RELATED APPLICATION

This application claims the priority benefit of Taiwan application serial no. 96131836, filed on Aug. 28, 2007. The entirety the above-mentioned patent application is hereby incorporated by reference herein and made a part of specification.

BACKGROUND OF THE INVENTION

1. Field of the Invention

The present invention relates to a display device. More particularly, the present invention relates to a liquid crystal display panel (LCD panel).

2. Description of Related Art

In recent years, the performance of thin film transistor liquid crystal displays (TFT-LCDs) is developing towards high contrast ratio, no grayscale inversion, little color shift, high brightness, deep color, high color saturation, fast response, and wide viewing angle.

At present, many techniques can achieve the wide viewing angle, which includes the twist nematic (TN) liquid crystal plus wide viewing film, the in-plane switching (IPS) LCD panel, the fringe field switching (FFS) LCD panel, and the multi-domain vertically alignment (MVA) LCD panel and so on.

For example, the MVA LCD panel has a plurality of strip slits formed on pixel electrodes, and a plurality of strip protrusions arranged on a color filter array substrate. The combination of the slits and the protrusions makes liquid crystal molecules in a liquid crystal layer to be inclined in different directions, so as to achieve a wide viewing angle.

Figure 1:
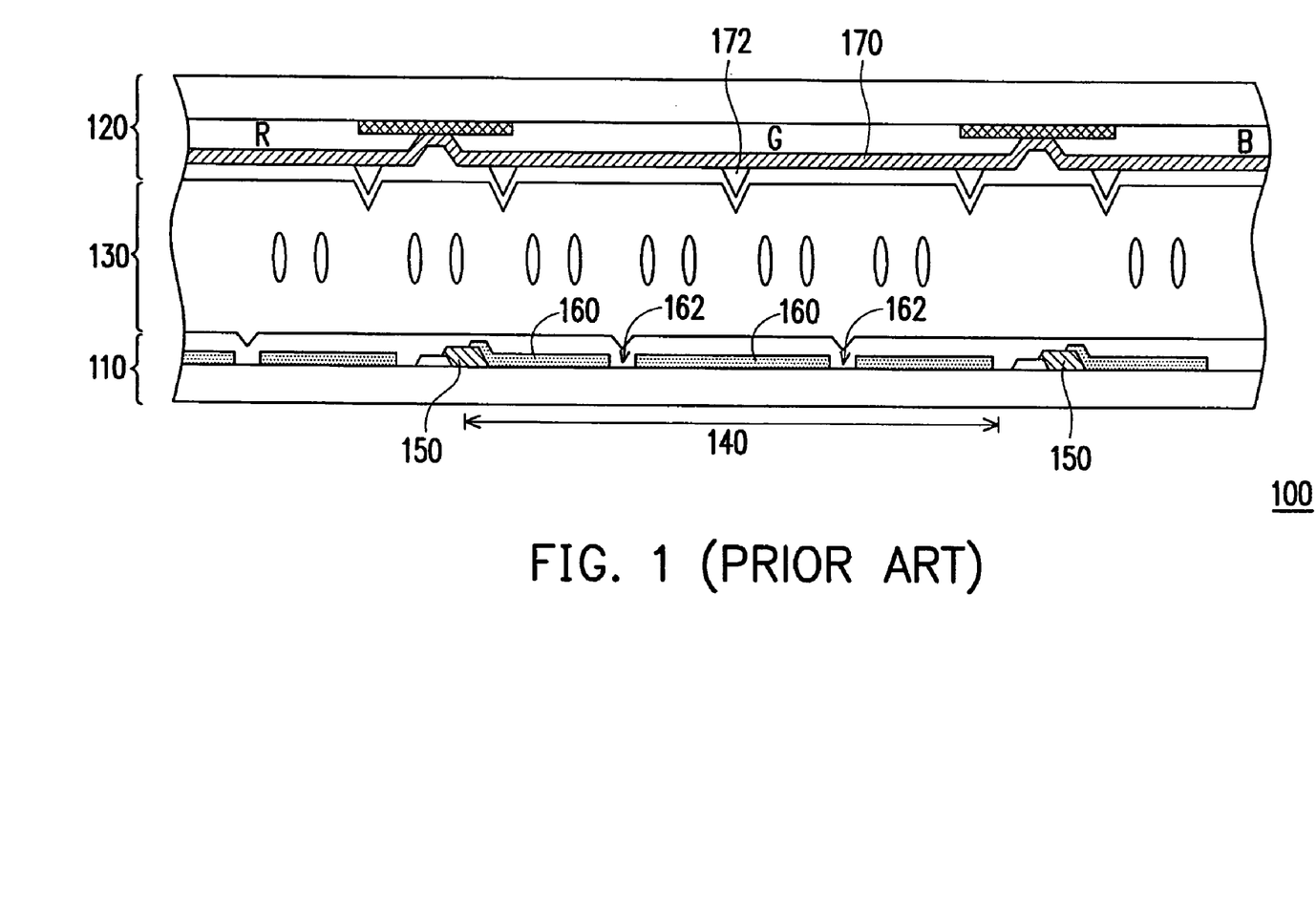
FIG. 1 is a partial cross-sectional view of a conventional MVA LCD panel.

FIG. 1 is the partial cross-sectional view of a conventional MVA LCD panel. Referring to FIG. 1, the conventional MVA LCD panel 100 includes an active device array substrate 110, an opposite substrate 120, and a liquid crystal layer 130. The active device array substrate 110 has a plurality of pixels 140 arranged in an array on the substrate. Each of the pixels 140 has an active device 150 and a pixel electrode 160 electrically connected to the active device 150. In addition, the opposite substrate 120 includes plural sets of R, G, B color filters and a common electrode 170. The liquid crystal layer 130 is disposed between the active device array substrate 110 and the opposite substrate 120.

As shown in FIG. 1, in order to increase the viewing angle of the MVA LCD panel 100, a plurality of strip slits 162 is usually formed in the pixel electrodes 160, and a plurality of protrusions 172 is usually disposed on the opposite substrate 120. Thus, the electric field distribution between the strip slits 162 and the strip protrusions 172 makes the liquid crystal molecules in the liquid crystal layer 130 to be inclined in different directions, thereby increasing the viewing angle of the MVA LCD panel 100.

In addition, Fujitsu has discussed on the response time of the MVA LCD panels in Society for Information Display (SID) in 2001, and proposed information related to brightness of the MVA LCD panels. The pixels and brightness of MVA LCD panels proposed by Fujitsu will be described as follows.

Figure 2A:
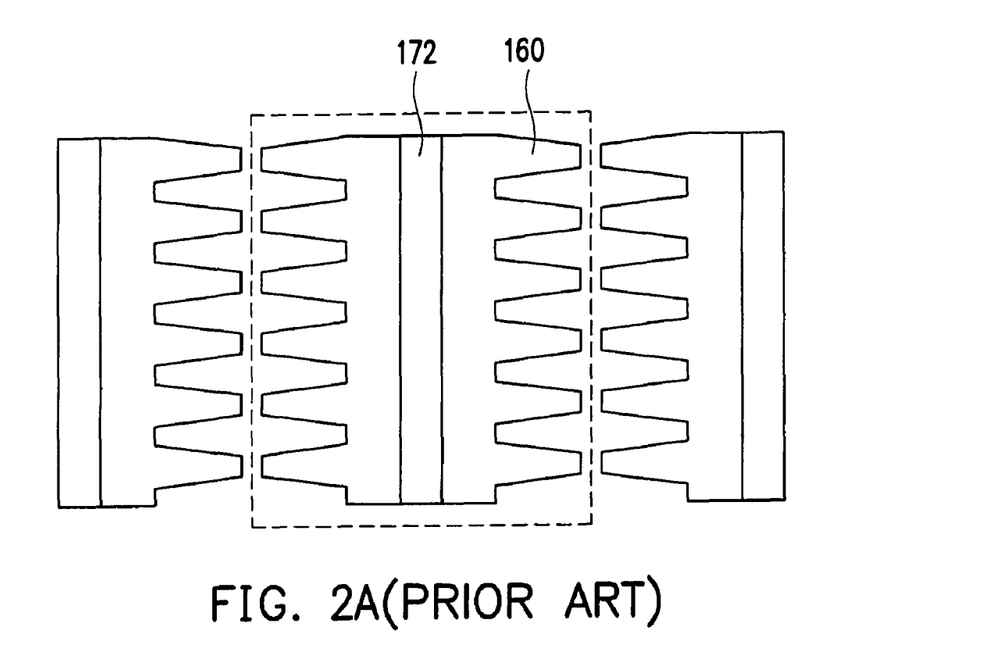
FIG. 2A is a top view of a part of pixels of a conventional MVA LCD panel.
Figure 2B:
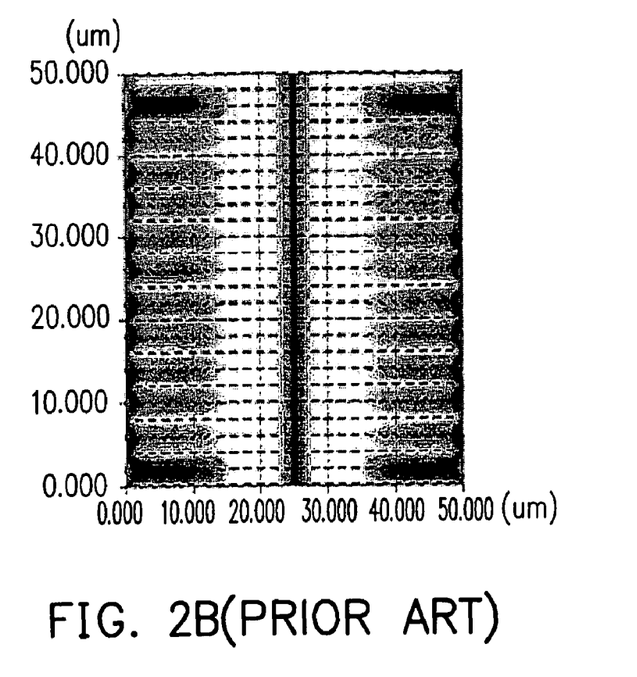
FIG. 2B is a diagram showing the optical simulation in a bright state of FIG. 2A.

FIG. 2A is a top view of a part of the pixels of a conventional MVA LCD panel. As shown in FIG. 2A, a protrusion 172 is disposed above a pixel electrode 160. FIG. 2B shows a result of the optical simulation in a bright state of FIG. 2A. As shown in FIG. 2B, distinct dark areas appear near the protrusions 172 at the central part and on two sides of FIG. 2B, so the overall brightness of the MVA LCD panel cannot be further improved.

Furthermore, the fabrication of the protrusion 172 requires an additional photolithography and etching process (PEP), which increases the manufacturing cost. Moreover, liquid crystal molecules around the protrusion 172 are liable to be influenced by the protrusion 172 to assume an inclined arrangement, and thus the light leakage of MVA LCD panel easily occurs in the dark state, resulting in the decrease of the contrast.

SUMMARY OF THE INVENTION

Accordingly, the present invention is directed to providing an LCD panel having wide viewing angle and enhanced contrast.

As embodied and broadly described herein, the present invention provides an LCD panel, which includes an opposite substrate, an active device array substrate, and a liquid crystal layer. The opposite substrate has a common electrode, and the common electrode does not need an aligned pattern. The active device array substrate has a plurality of scan lines, a plurality of data lines, and a plurality of pixels. Each of the pixels is controlled by one of the scan lines and one of the data lines, correspondingly. Each pixel has an active device, a first pixel electrode, a dielectric layer, and a second pixel electrode. The active device is electrically connected to one of the scan lines and one of the data lines, correspondingly. The first pixel electrode has a first slit and is electrically connected to the active device. The dielectric layer covers the first pixel electrode. The second pixel electrode is disposed between the dielectric layer and the opposite substrate. The second pixel electrode has a second slit, and is electrically connected to the first pixel electrode. The first slit and the second slit are substantially aligned to each other, and the width of first slit is smaller than that of second slit. The liquid crystal layer is disposed between the active device array substrate and the opposite substrate.

In an embodiment of the present invention, the dielectric layer of each of the pixels has an opening, and the second pixel electrode of each of the pixels is electrically connected to the first pixel electrode through the opening.

In an embodiment of the present invention, the second slit of each of the second pixel electrodes includes a main slit and a plurality of fine slits extending outward from an edge of the main slit. Preferably, the extending directions of the fine slits of the second pixel electrodes may be substantially in parallel.

In an embodiment of the present invention, extending directions of the first slit and the second slit of each of the pixels are at an angle to an extending direction of the scan line. In other embodiments, the extending direction of the first slits of the pixels may be substantially parallel to the extending direction of the scan lines, and the extending direction of the second slits may be substantially parallel to the extending direction of the data lines.

The present invention also provides an LCD panel, which includes an opposite substrate, an active device array substrate, and a liquid crystal layer. The opposite substrate has a common electrode. The active device array substrate has a plurality of scan lines, a plurality of data lines, and a plurality of pixels. Each of the pixels is controlled by one of the scan lines and one of the data lines, correspondingly. Each pixel has an active device, a first pixel electrode, a dielectric layer, and a second pixel electrode. The active device is electrically connected to one of the scan lines and one of the data lines, correspondingly. The first pixel electrode is electrically connected to the active device. The dielectric layer covers the first pixel electrode. The second pixel electrode is disposed between the dielectric layer and the opposite substrate and located on the dielectric layer within an area of the first pixel electrode, wherein the second pixel electrode has plural sets of slits arranged in parallel. The liquid crystal layer is disposed between the active device array substrate and the opposite substrate.

In an embodiment of the present invention, an oblique electric field is generated around the slits of the second pixel electrodes when the pixels are driven.

In an embodiment of the present invention, an extending direction of the slits is at an angle to an extending direction of the scan lines.

In an embodiment of the present invention, the dielectric layer of each of the pixels has an opening, and the second pixel electrode of each of the pixels is electrically connected to the first pixel electrode through the opening.

In an embodiment of the present invention, each of the pixels further includes a common line disposed below the first pixel electrode.

In an embodiment of the present invention, the first pixel electrodes include transmissive electrodes or reflective electrodes, and the second pixel electrodes include transmissive electrodes or reflective electrodes.

In an embodiment of the present invention, a material of the first pixel electrodes, the second pixel electrodes, and the common electrode includes indium zinc oxide (IZO), indium tin oxide (ITO), or other transparent conductive materials, and a thickness of the first pixel electrodes, the second pixel electrodes, and the common electrode is between about 40 nm and about 150 μm, respectively.

In an embodiment of the present invention, a material of the first pixel electrodes and the second pixel electrodes includes aluminum (Al), molybdenum (Mo), titanium (Ti), or other metal materials.

In an embodiment of the present invention, a material of the dielectric layers of the pixels includes silicon nitride.

In an embodiment of the present invention, a thickness of the dielectric layers of the pixels is between about 100 nm and about 1000 nm.

In an embodiment of the present invention, a material of the liquid crystal layer includes a nematic liquid crystal.

In an embodiment of the present invention, a cell gap of the liquid crystal layer is between about 2500 nm and about 4000 nm.

The present invention provides a pixel electrically connected to a scan line and a data line on a substrate. The pixel includes an active device, a first pixel electrode, a dielectric layer, and a second pixel electrode. The active device is disposed on the substrate, and is electrically connected to the scan line and the data line. The first pixel electrode has a first slit, and is electrically connected to the active device. The dielectric layer covers the first pixel electrode, such that the first pixel electrode is disposed between the dielectric layer and the substrate. The second pixel electrode is disposed on the dielectric layer, and is electrically connected to the first pixel electrode. The second pixel electrode has a second slit. The first slit and the second slit are substantially aligned to each other, and the width of first slit is smaller than that of second slit.

The present invention further provides a pixel electrically connected to a scan line and a data line on a substrate. The pixel includes an active device, a first pixel electrode, a dielectric layer, and a second pixel electrode. The active device is disposed on the substrate, and is electrically connected to the scan line and the data line. The first pixel electrode is electrically connected to the active device. The dielectric layer covers the first pixel electrode, so that the first pixel electrode is disposed between the dielectric layer and the substrate. The second pixel electrode is disposed on the dielectric layer within an area of the first pixel electrode. The second pixel electrode has plural sets of slits arranged in parallel, and is electrically connected to the first pixel electrode.

Based on the above, the present invention uses the arrangement of the pixel electrodes in each pixel and adjusts input data voltages, so as to adjust the inclined directions of the liquid crystal molecules around each of the pixel electrodes. Therefore, the present invention achieves the effect of wide viewing angle without using the protrusions of the conventional art. In addition, domain number and degree of color shift adjustment of the liquid crystal molecules above each pixel can be controlled according to the number of divisions and shape of the second pixel electrode in each pixel, so as to improve the display quality.

In order to make the aforementioned features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
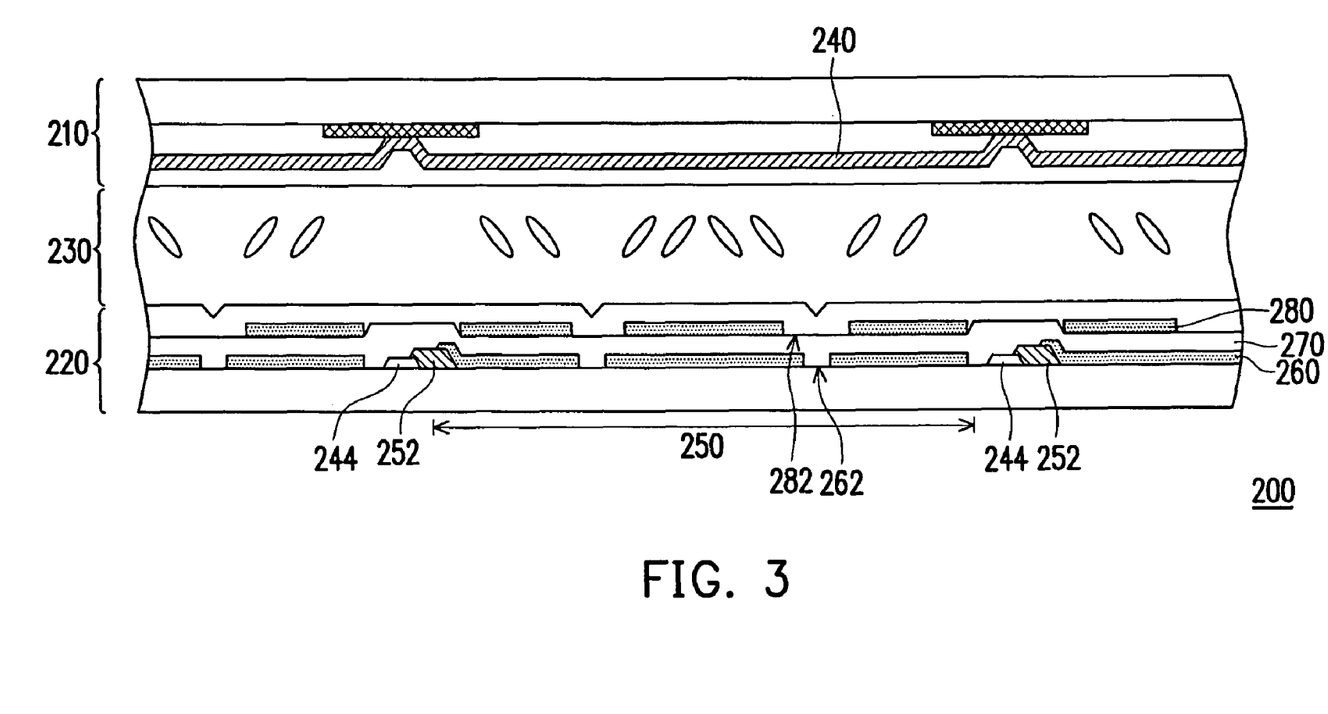
FIG. 3 is a partial schematic view of an LCD panel of the present invention.
Figure 4:
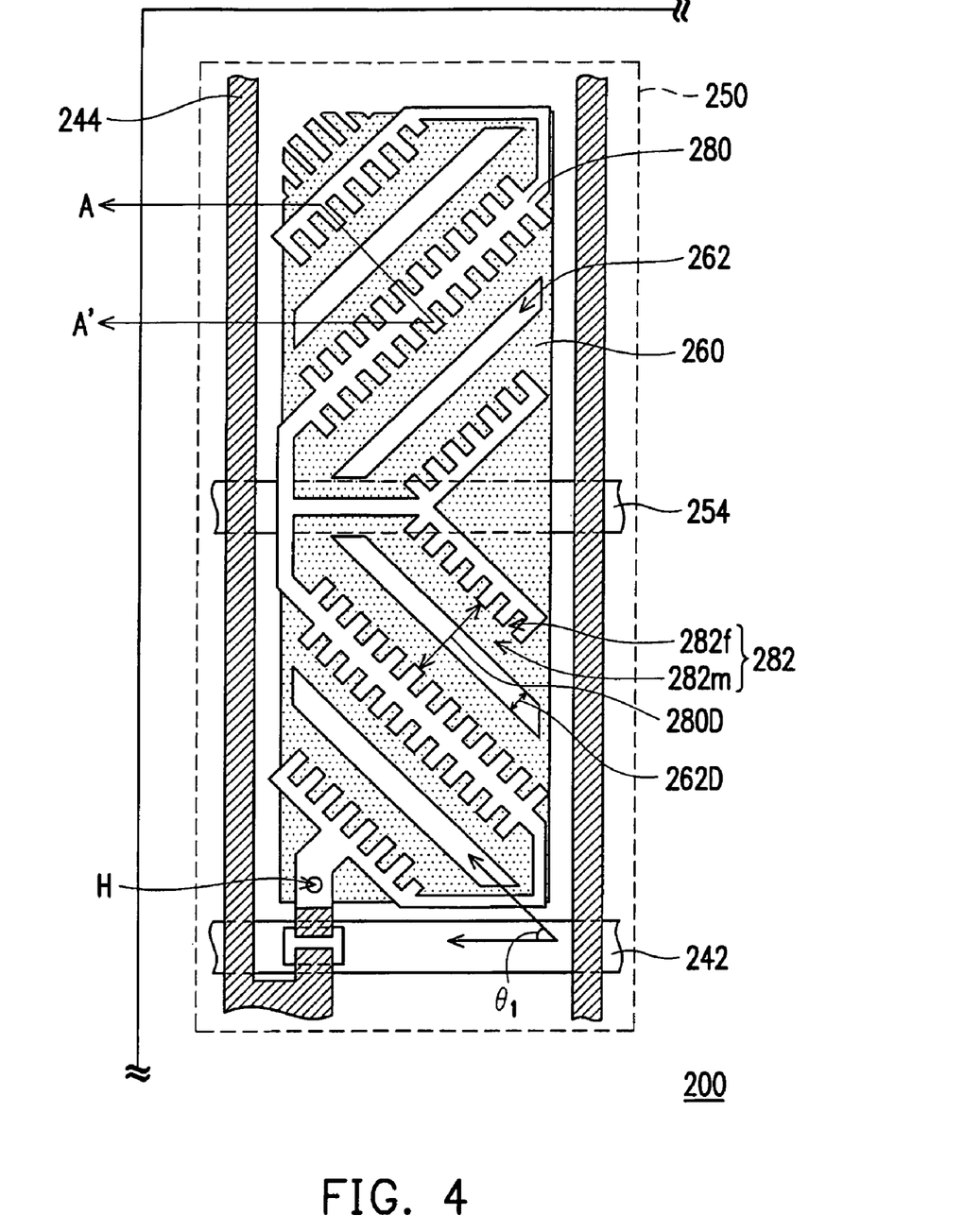
FIG. 4 is a partial top view of the LCD panel of FIG. 3.

FIG. 3 is a partial schematic view of an LCD panel of the present invention. Referring to FIG. 3, the LCD panel 200 includes an opposite substrate 210, an active device array substrate 220, and a liquid crystal layer 230. The opposite substrate 210 has a common electrode 240, and the common electrode 240 does not need an aligned pattern, for example. The liquid crystal layer 230 is disposed between the active device array substrate 220 and the opposite substrate 210. In addition, the active device array substrate 220 has a plurality of scan lines 242 (as shown in FIG. 4), a plurality of data lines 244, and a plurality of pixels 250. Each of the pixels 250 is controlled by one of the scan lines 242 and one of the data lines 244, correspondingly. In this embodiment, only a few of pixels 250 of the LCD panel 200 are shown.

FIG. 4 is a partial top view of the LCD panel of FIG. 3, and only one of the pixels 250 is shown in FIG. 4 for illustration. Referring to FIGS. 3 and 4, the pixel 250 includes an active device 252, a first pixel electrode 260, a dielectric layer 270, and a second pixel electrode 280. The active device 250 is electrically connected to one of the scan lines 242 and one of the data lines 244, correspondingly. The first pixel electrode 260 has a first slit 262, and is electrically connected to the active device 252. The dielectric layer 270 covers the first pixel electrode 260. The second pixel electrode 280 has a second slit 282, and is disposed between the dielectric layer 270 and the opposite substrate 210. The second pixel electrode 280 is electrically connected to the first pixel electrode 260. In this embodiment, the second pixel electrode 280, for example, is electrically connected to the first pixel electrode 260 through an opening H in the dielectric layer 270. Moreover, as shown in FIG. 4, the pixel 250 farther includes a common line 254 disposed below the first pixel electrode 260. The common line 254 and the first pixel electrode 260 form a storage capacitor, which is known one skilled in the art, and will not be described herein again.

Referring to FIG. 4 again, the first slit 262 and the second slit 282 are substantially aligned to each other, and the width 262D of the first slit 262 is smaller than the width 282D of the second slit 282. Definitely, the line width and alignment of the first slit 262 and the second slit 282 are often influenced by variations of processes and have some changes (tolerance) accordingly, which still falls within the scope of the present invention. As shown in FIG. 4, the second slit 282 of the second pixel electrode 280 includes a main slit 282m and a plurality of fine slits 282f extending outward from an edge of the main slit 282m. The extending directions of the fine slits 282f of the second pixel electrode 280 in the same domains are substantially in parallel.

Figure 5:
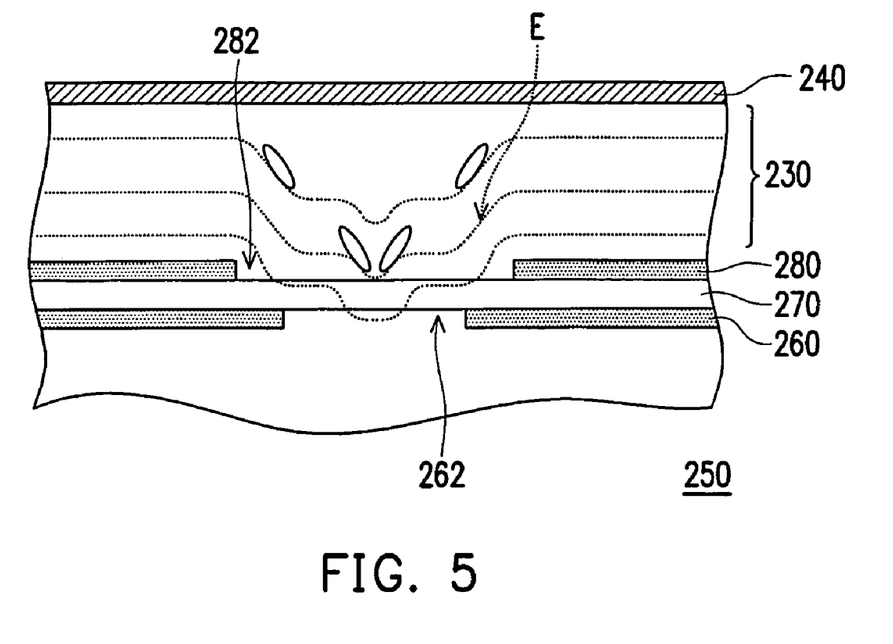
FIG. 5 is a diagram showing the electric field distribution along a section line A-A' in FIG. 4 when a pixel is driven.

It should be noted that unlike using the protrusions 172 (shown in FIG. 1) in the conventional art for making the liquid crystal layer present a plurality of alignment domains in different inclined directions, the present invention uses the arrangement between the first slit 262 of the first pixel electrode 260 and the second slit 282 of the second pixel electrode 280 to achieve the effect of the wide viewing angle display. FIG. 5 is a diagram showing the electric field distribution along a section line A-A' in FIG. 4 when a pixel is driven. Referring to FIG. 5, when the pixel 250 is driven, an oblique electric field E is generated around the first slit 262 and the second slit 282, such that the corresponding part of the liquid crystal layer 230 above the pixel 250 is divided into a plurality of alignment domains, and the liquid crystal molecules are inclined along the direction of the oblique electric field E. Thus, the LCD panel 200 shows the effect of wide viewing angle. Therefore, the present invention does not need additional wide viewing films or protrusions, thereby reducing the production cost and the material cost.

Figure 6A:
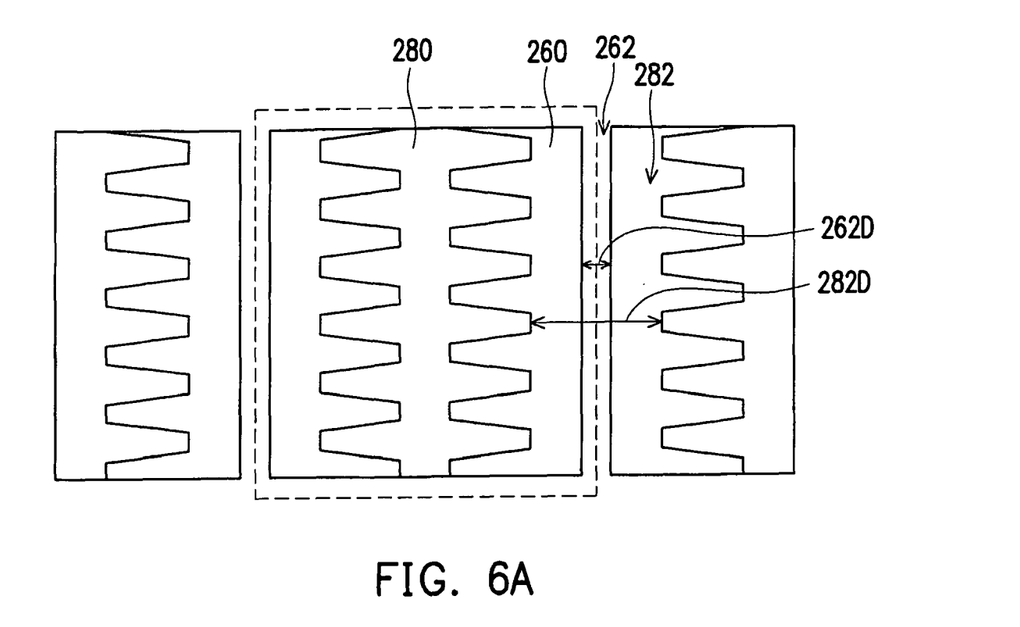
FIG. 6A is a partial top view of an LCD panel of the present invention.
Figure 6B:
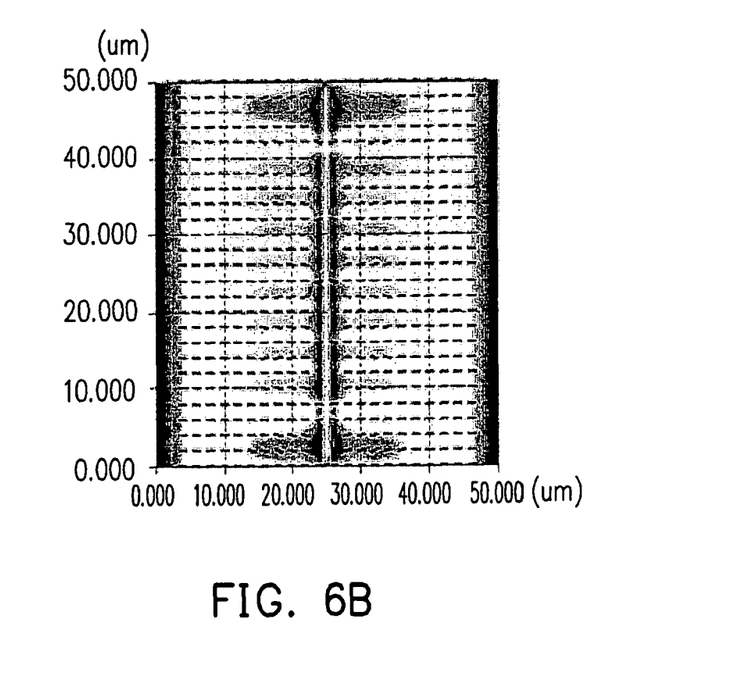
FIG. 6B shows the result of the optical simulation in a bright state of FIG. 6A.

In order to illustrate the display effect of the LCD panel of the present invention in detail, FIG. 6A is a partial top view of an LCD panel of the present invention, and FIG. 6B shows the result of the optical simulation in a bright state of FIG. 6A. Referring to FIG. 6A, the first slit 262 of the first pixel electrode 260 and the second slit 282 of the second pixel electrode 280 are substantially aligned to each other, and the width 262D of the first slit 262 is smaller than the width 282D of the second slit 282. Then, referring to FIG. 6B, the simulated brightness in the bright state of the LCD panel of the present invention is improved significantly as compared with that of the conventional art (shown in FIG. 2B).

Figure 7A:
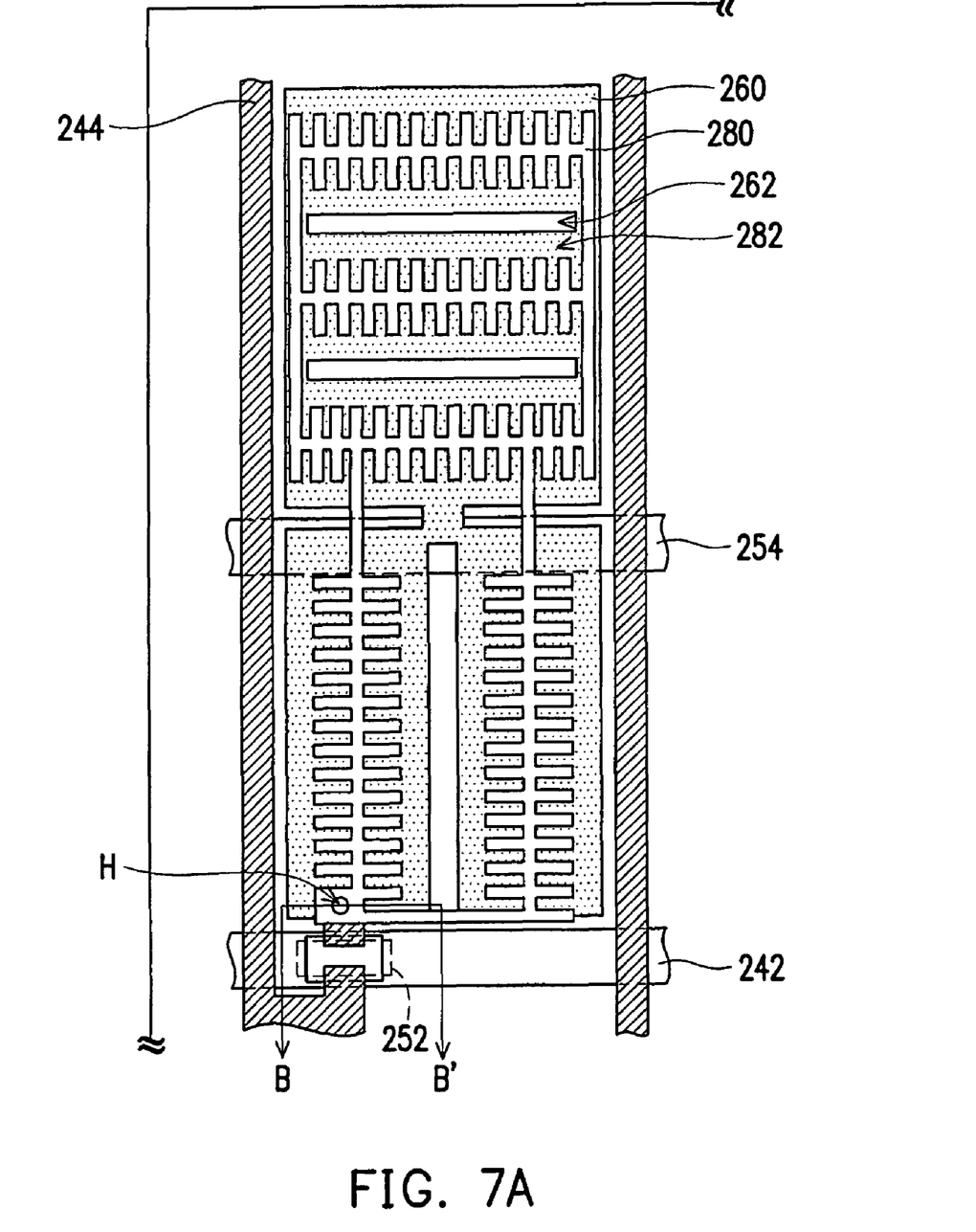
FIG. 7A is a partial schematic view of an LCD panel of the present invention.

In order to further improve the display quality of the LCD, the designer can adjust the number, position, shape, and arrangement of the first slits 262 and the second slits 282 according to color shift adjustment requirements. For example, in FIG. 4, the extending directions of the first slit 262 and the second slit 282 are at an angle θ1 to the extending direction of the scan line 242. At this time, the corresponding part of the liquid crystal layer 230 above the pixel 250 are inclined at the angle θ1 along the first slit 262 and the second slit 282, so as to substantially divide into a plurality of alignment domains at the angle θ1 to the scan line 242. Definitely, the extending direction of the first slit 262 and the second slit 282 may be substantially parallel to the extending direction of the scan line 242, and the extending direction of the first slit 262 and the second slit 282 may be substantially parallel to the extending direction of the data line 244, as shown in FIG. 7A. At this time, a plurality of alignment domains of the liquid crystal layer 230 above the pixel 250 will be substantially parallel to the extending directions of the scan line 242 and the data line 244. In this embodiment, the material of the liquid crystal layer 230, for example, is the nematic liquid crystal, and the cell gap of the liquid crystal layer 230, for example, is between about 2500 nm and about 4000 nm. Definitely, the liquid crystal may also be of other types.

Figure 7B:
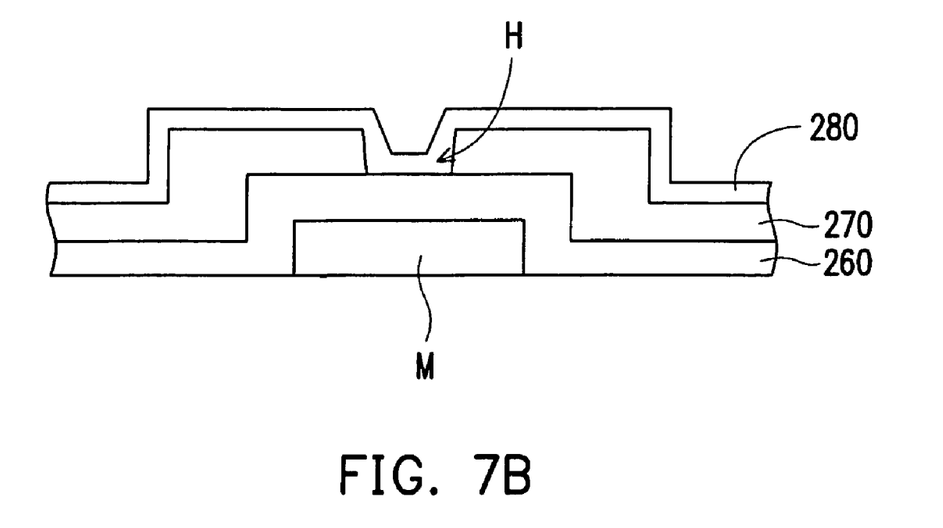
FIG. 7B is a cross-sectional view taken along a section line B-B' of FIG. 7A.

In practice, FIG. 7B is a sectional view taken along a section line B-B' of FIG. 7A. Referring to FIG. 7B, the second pixel electrode 280 of the present invention, for example, is electrically connected to the first pixel electrode 260 through an opening H in the dielectric layer 270, and the fabricating method is described as follows. After a metal layer M which for example is used as a drain metal layer of the active device 252 (shown in FIG. 7A) is formed, a first pixel electrode 260 is formed on the metal layer M of a part of the active device 252 (shown in FIG. 7A). Thus, the first pixel electrode 260 is electrically connected to the active device 252 through the metal layer M. Then, a dielectric layer 270 having an opening H is formed. After that, a second pixel electrode 280 is formed. Thus, when the pixel 250 is driven, the first pixel electrode 260 and the second pixel electrode 280 are at a same level, and can form the oblique electric field E (shown in FIG. 5) around the first slit 262 and the second slit 282, such that the corresponding liquid crystal layer 230 presents a plurality of different alignment domains, so as to increase the viewing angle of the LCD panel.

It should be noted that the strength of the oblique electric field E is crucial for improving the response speed of the LCD panel. In the present invention, the designer can control the strength of the oblique electric field E by adjusting the width of the first slit 262, the width of the second slit 282, the thickness of the dielectric layer 270, and the dielectric coefficient of the dielectric layer 270, so as to improve the response speed of the LCD panel. In detail, when the strength of the oblique electric field E is high, the liquid crystal molecules around the first slit 262 and the second slit 282 are quickly inclined. The liquid crystal molecules above the second pixel electrode 280 will be pushed by the liquid crystal molecules therearound to quickly form the multi-domains. Therefore, this design helps to improve the response speed of the LCD panel.

Referring to FIG. 7B again, the first pixel electrode 260 may be a transmissive electrode or a reflective electrode, and the second pixel electrode 280 may also be a transmissive electrode or a reflective electrode. Generally speaking, when the LCD panel 200 is a transmissive LCD panel 200, the material of the first pixel electrode 260, the second pixel electrode 280, and the common electrode 240 may be indium tin oxide (ITO), indium zinc oxide (IZO), or other transparent conductive materials. The thicknesses of the first pixel electrode 260, the second pixel electrode 280, and the common electrode 240 may be, for example, between about 40 nm and about 150 nm. Definitely, if the LCD panel 200 is a reflective LCD, the material of the first pixel electrode 260 and the second pixel electrode 280 may be Al, Mo, Ti, or other metal materials. Moreover, in this embodiment, the material of the dielectric layer 270, for example, is silicon nitride, and the thickness of the dielectric layer 270, for example, is between about 100 nm and about 1000 nm.

Figure 8:
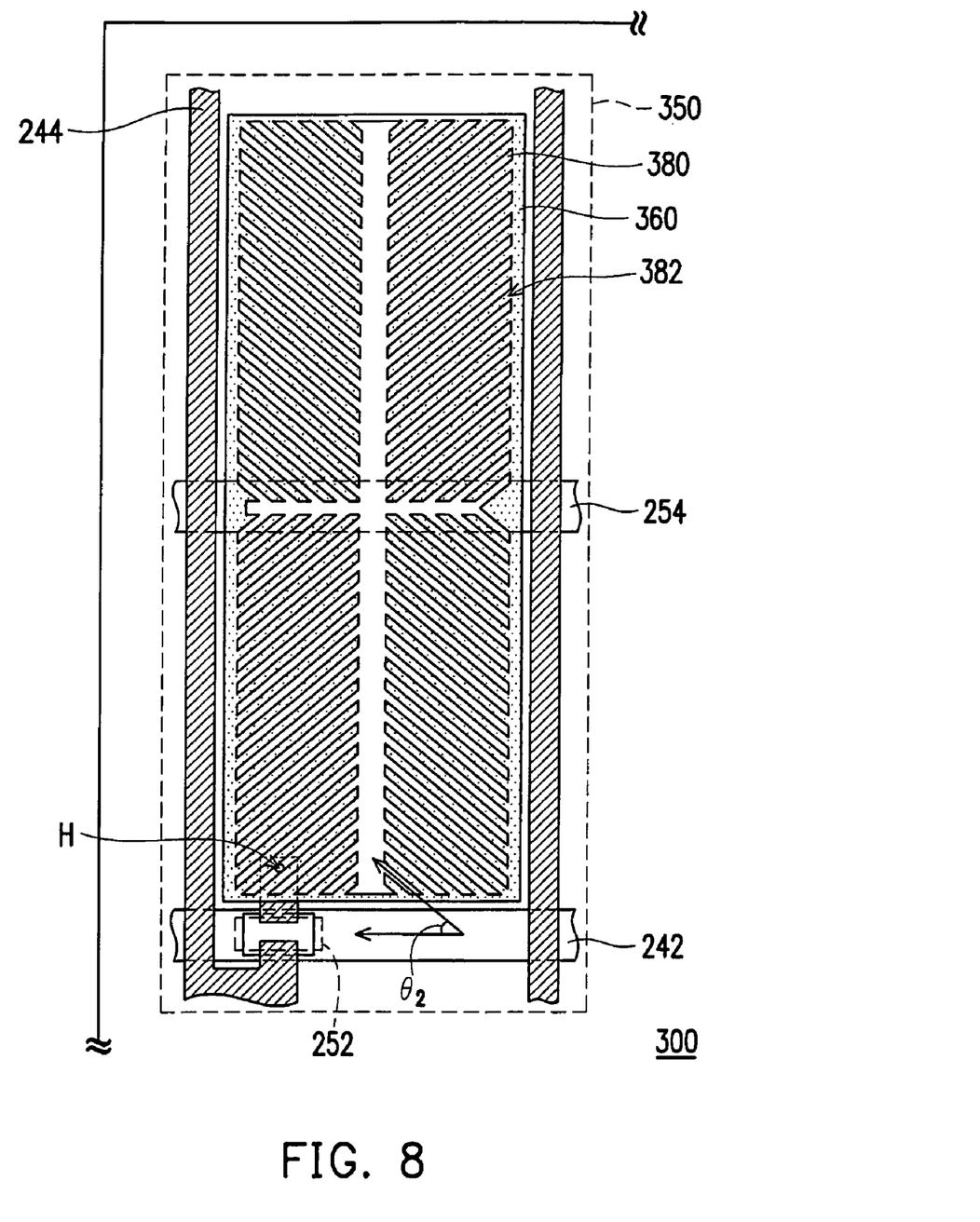
FIG. 8 is a partial schematic view of another LCD panel of the present invention.

FIG. 8 is a partial schematic view of another LCD panel of the present invention, and only one pixel 350 is shown in FIG. 8 for illustration. Referring to FIG. 8, the LCD panel 300 is similar to the LCD panel 200 of the first embodiment, and is different in terms of the shape and stacking manner of the first pixel electrode 360 and the second pixel electrode 380 in the pixel 350. The pixel 350 of this embodiment includes an active device 252, a first pixel electrode 360, a dielectric layer (not shown), and a second pixel electrode 380. The second pixel electrode 380 is located on the dielectric layer (not shown) within the area of the first pixel electrode 360, and has plural sets of slits 382 arranged in parallel. Moreover, in this embodiment, the second pixel electrode 380, for example, is electrically connected to the first pixel electrode 360 through an opening H in the dielectric layer (not shown).

As shown in FIG. 8, the extending direction of the slits of the second pixel electrode 380 is at an angle $\theta_2$ to the extending direction of the scan line 242. When each of the pixels 250 is driven, the slits 382 of the second pixel electrode 380 divide the corresponding part of the liquid crystal layer into a plurality of alignment domains at the angle $\theta_2$ to the scan line 242, so as to achieve the display effect of wide viewing angle. Definitely, the designer can adjust the angle $\theta_2$ according to design requirements, which will not be described herein.

As described above, the present invention provides a wide viewing angle technology different from the conventional MVA LCD, which improves the brightness and contrast, and has a quicker response speed. The present invention does not need additional wide viewing films or protrusions when improving the viewing angle, so the cost can be reduced.

It will be apparent to persons of ordinary art in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) panel, comprising:
an opposite substrate having a common electrode;
an active device array substrate having a plurality of scan lines, a plurality of data lines, and a plurality of pixels, wherein each of the pixels is controlled by one of the scan lines and one of the data lines correspondingly, and each of the pixels comprises:
an active device electrically connected to one of the scan lines and one of the data lines correspondingly;
a first pixel electrode having a first slit and electrically connected to the active device;
a dielectric layer covering the first pixel electrode and an area of the dielectric layer being substantially larger than an area of the first pixel electrode;
a second pixel electrode disposed between the dielectric layer and the opposite substrate and electrically connected to the first pixel electrode, the area of the first pixel electrode being substantially larger than an area of the second pixel electrode, and the second pixel electrode being substantially located on the dielectric layer within the area of the first pixel electrode, the second pixel electrode having a second slit, wherein the first slit and the second slit are substantially aligned to each other, and a width of the first slit is smaller than that of the second slit; and
a liquid crystal layer disposed between the active device array substrate and the opposite substrate.

2. The LCD panel as claimed in claim 1, wherein the dielectric layer of each of the pixels has an opening, and the second pixel electrode of each of the pixels is electrically connected to the first pixel electrode through the opening.

3. The LCD panel as claimed in claim 1, wherein the second slit of each of the second pixel electrodes comprises a main slit and a plurality of fine slits extending outward from an edge of the main slit.

4. The LCD panel as claimed in claim 3, wherein extending directions of the fine slits of each of the second pixel electrodes are substantially in parallel.

5. The LCD panel as claimed in claim 1, wherein each of the pixels further comprises a common line disposed below the first pixel electrode.

6. The LCD panel as claimed in claim 1, wherein an oblique electric field is generated around the first slit and the second slit when each of the pixels is driven.

7. The LCD panel as claimed in claim 1, wherein extending directions of the first slit and the second slit of each of the pixels are at an angle to an extending direction of the scan line.

8. The LCD panel as claimed in claim 1, wherein an extending direction of the first slit and the second slit of each of the pixels is substantially in parallel to an extending direction of the scan line or the data line.

9. The LCD panel as claimed in claim 1, wherein the first pixel electrodes comprise transmissive electrodes or reflective electrodes, and the second pixel electrodes comprise transmissive electrodes or reflective electrodes.

10. The LCD panel as claimed in claim 1, wherein a material of the first pixel electrodes, the second pixel electrodes, and the common electrode comprises indium zinc oxide (IZO), indium tin oxide (ITO), or other transparent conductive materials.

11. The LCD panel as claimed in claim 1, wherein a thickness of the first pixel electrodes, the second pixel electrodes, and the common electrode is between about 40 nm and about 150 nm, respectively.

12. The LCD panel as claimed in claim 1, wherein a material of the first pixel electrodes and the second pixel electrodes comprises aluminum, molybdenum, titanium, or other metal materials.

13. The LCD panel as claimed in claim 1, wherein a material of the dielectric layer of each of the pixels comprises silicon nitride.

14. The LCD panel as claimed in claim 1, wherein a thickness of the dielectric layer of each of the pixels is between about 100 nm and about 1000 nm.

15. The LCD panel as claimed in claim 1, wherein a material of the liquid crystal layer comprises a nematic liquid crystal.

16. The LCD panel as claimed in claim 1, wherein a cell gap of the liquid crystal layer is between about 2500 mn and about 4000 nm.

17. An LCD panel, comprising:
an opposite substrate having a common electrode;
an active device array substrate comprising a plurality of scan lines, a plurality of data lines, and a plurality of pixels, wherein each of the pixels is controlled by one of the scan lines and one of the data lines correspondingly, and each of the pixels comprises:
an active device electrically connected to one of the scan lines and one of the data lines correspondingly;
a first pixel electrode electrically connected to the active device;
a dielectric layer covering the first pixel electrode and an area of the dielectric layer being substantially larger than an area of the first pixel electrode;
a second pixel electrode disposed between the dielectric layer and the opposite substrate, the area of the first pixel electrode being substantially larger than an area of the second pixel electrode, and the second pixel electrode being substantially located on the dielectric layer within the area of the first pixel electrode, wherein the second pixel electrode has plural sets of slits arranged in parallel; and
a liquid crystal layer disposed between the active device array substrate and the opposite substrate.

18. The LCD panel as claimed in claim 17, wherein the dielectric layer of each of the pixels has an opening, and the second pixel electrode is electrically connected to the first pixel electrode through the opening.

19. The LCD panel as claimed in claim 17, wherein each of the pixels further comprises a common line disposed below the first pixel electrode.

20. The LCD panel as claimed in claim 17, wherein an oblique electric field is generated around the slits of the second pixel electrode when each of the pixels is driven.

21. The LCD panel as claimed in claim 17, wherein an extending direction of the slits is at an angle to an extending direction of the scan line.

22. The LCD panel as claimed in claim 17, wherein the first pixel electrodes comprise transmissive electrodes or reflective electrodes, and the second pixel electrodes comprise transmissive electrodes or reflective electrodes.

23. The LCD panel as claimed in claim 17, wherein a material of the first pixel electrodes, the second pixel electrodes, and the common electrode comprises indium zinc oxide (IZO), indium tin oxide (ITO), or other transparent conductive materials.

24. The LCD panel as claimed in claim 23, wherein a thickness of the first pixel electrodes, the second pixel electrodes, and the common electrode is between about 40 nm and about 150 nm, respectively.

25. The LCD panel as claimed in claim 17, wherein a material of the first pixel electrodes and the second pixel electrodes comprises aluminum, molybdenum, titanium, or other metal materials.

26. The LCD panel as claimed in claim 17, wherein a material of the dielectric layer of each of the pixels comprises silicon nitride.

27. The LCD panel as claimed in claim 17, wherein a thickness of the dielectric layer of each of the pixels is between about 100 nm and about 1000 nm.

28. The LCD panel as claimed in claim 17, wherein a material of the liquid crystal layer comprises a nematic liquid crystal.

29. The LCD panel as claimed in claim 17, wherein a cell gap of the liquid crystal layer is between about 2500 nm and about 4000 nm.

30. A pixel electrically connected to a scan line and a data line on a substrate, comprising:
an active device disposed on the substrate and electrically connected to the scan line and the data line;
a first pixel electrode having a first slit and electrically connected to the active device;
a dielectric layer covering the first pixel electrode and an area of the dielectric layer being substantially larger than an area of the first pixel electrode, wherein the first pixel electrode is disposed between the dielectric layer and the substrate; and
a second pixel electrode disposed on the dielectric layer and electrically connected to the first pixel electrode, the area of the first pixel electrode being substantially larger than an area of the second pixel electrode, and the second pixel electrode being substantially located on the dielectric layer within the area of the first pixel electrode, the second pixel electrode having a second slit, wherein the first slit and the second slit are substantially aligned to each other, and a width of the first slit is smaller than that of the second slit.

31. The LCD panel as claimed in claim 1, wherein the dielectric layer covering the first pixel electrode and the first slit.

32. The LCD panel as claimed in claim 17, wherein the dielectric layer covering the first pixel electrode and the first slit.

* * * * *